J. LIPMAN & M. FRIEDBERG.
Strainers.
No. 157,847. Patented Dec. 15, 1874.
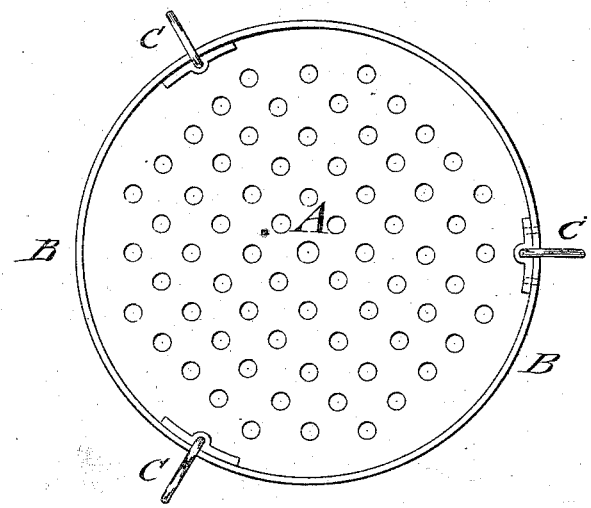
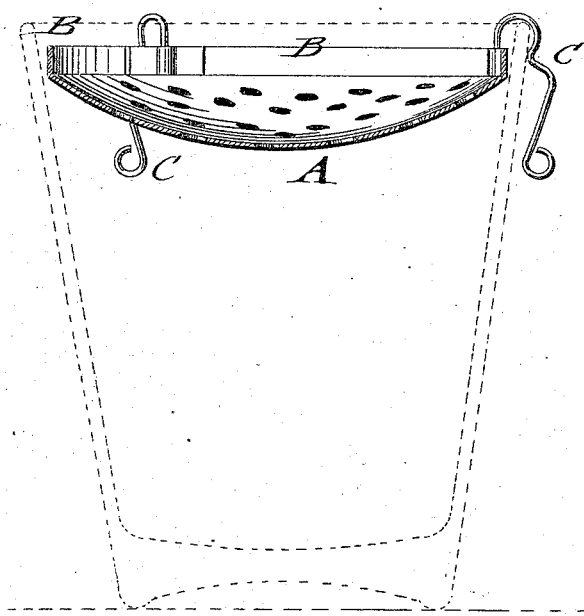

UNITED STATES PATENT OFFICE.

JOHN LIPMAN AND MARTIN FRIEDBERG, OF TOLEDO, OHIO.

IMPROVEMENT IN STRAINERS.

Specification forming part of Letters Patent No. 157,847, dated December 15, 1874; application filed September 12, 1874.

*To all whom it may concern:*

Be it known that we, JOHN LIPMAN and MARTIN FRIEDBERG, of Toledo, Lucas county, Ohio, have invented a new and Improved Strainer for iced drinks, of which the following is a specification:

In the drawing, Figure 1 represents a top view, and Fig. 2 a vertical central section, of our improved strainer for iced drinks of all kinds.

Similar letters of reference indicate corresponding parts.

The object of our invention is to furnish a strainer, to be used for drinking lemonade and other iced drinks, by which pieces of ice, lemon, and other substance are prevented from entering the mouth of the drinker, and also flies and other insects from getting into the liquid. The strainer is durable and easily cleaned, and firmly retained on the tumbler during use. Our invention consists of a concave, perforated, or reticulated strainer, having a rim fitting closely to the interior circumference of the tumbler or other vessel, and fastening spring-hooks for retaining the strainer firmly thereon.

In the drawing, A represents the concave part of the strainer, being made, preferably, of perforated sheet metal, suitably plated and finished, and furnished in sizes to fit the diameters of the different tumblers or vessels in general use for iced drinks. A circumferential rim, B, fits exactly the inner periphery of the vessel, and has riveted or otherwise attached to it two or more suitable spring-hooks, C, which are bent in such a manner that they support the perforated part across the top part of the tumbler, and are rigidly applied to the rim of the same, as shown in Fig. 2. The strainer prevents the pieces of lemon or other substances from being carried into the mouth, and admits, therefore, the more convenient drinking of iced beverages. The intimate contact of the rim of the strainer with the tumbler, and the firm position thereon during drinking, without requiring to be held by the hand, necessitates the passage of the liquid through the perforated plate, and forms a very neat, convenient, and readily-cleaned device for drinking lemonade and other iced drinks without annoyance.

We do not desire to claim a perforated strainer fitted to the rim of a drinking-vessel by means of a pendent flange, as this is not new.

Having thus described our invention, we claim as new and desire to secure by Letters Patent—

The concave perforated strainer A, having a vertical circumferential rim, B, and spring-hooks C, adapted to be inserted within a tumbler, and to be secured thereto in the manner and for the purpose set forth.

JOHN LIPMAN.
MARTIN FRIEDBERG.

Witnesses for JOHN LIPMAN:
  W. BURWICK,
  WM. MARKSCHEFFEL.
Witnesses for MARTIN FRIEDBERG:
  PAUL GOEPEL,
  T. B. MOSHER.